US010295811B2

(12) United States Patent
Svoboda et al.

(10) Patent No.: US 10,295,811 B2
(45) Date of Patent: May 21, 2019

(54) LARGE FIELD OF VIEW, HIGH RESOLUTION MICROSCOPE

(71) Applicant: Howard Hughes Medical Institute, Chevy Chase, MD (US)

(72) Inventors: Karel Svoboda, Ashburn, VA (US); Daniel Flickinger, Frederick, MD (US); Nicholas Sofroniew, Ashburn, VA (US)

(73) Assignee: Howard Hughes Medical Institute, Chevy Chase, MD (US)

( * ) Notice: Subject to any disclaimer, the term of this patent is extended or adjusted under 35 U.S.C. 154(b) by 0 days.

(21) Appl. No.: 15/340,597

(22) Filed: Nov. 1, 2016

(65) Prior Publication Data

US 2017/0123196 A1 May 4, 2017

Related U.S. Application Data

(60) Provisional application No. 62/249,342, filed on Nov. 1, 2015, provisional application No. 62/286,108, filed
(Continued)

(51) Int. Cl.
*G02B 21/00* (2006.01)
*G02B 21/33* (2006.01)
(Continued)

(52) U.S. Cl.
CPC ......... *G02B 21/006* (2013.01); *G02B 21/008* (2013.01); *G02B 21/0032* (2013.01);
(Continued)

(58) Field of Classification Search
None
See application file for complete search history.

(56) References Cited

U.S. PATENT DOCUMENTS 5,334,830 A * 8/1994 Fukuyama ......... G02B 21/0032
250/216
6,134,002 A * 10/2000 Stimson ................ G01J 3/2803
250/458.1
(Continued)

FOREIGN PATENT DOCUMENTS

JP 5784393 B2 9/2015

OTHER PUBLICATIONS

International Search Report with Written Opinion, dated Feb. 8, 2017, for corresponding international application PCT/US2016/059902.
(Continued)

*Primary Examiner* — Kate H Luo
(74) *Attorney, Agent, or Firm* — Myers Wolin, LLC

(57) ABSTRACT

A microscope system including: a source of light; a sample objective configured for focusing the light at a focal plane within a sample; a remote focus unit configured for changing a position of the focal plane along an axis perpendicular to the focal plane; one or more optical element configured for directing the focused light to a location within the focal plane; and a detector configured for detecting light emitted from the focal plane within the sample; wherein the one or more optical element is located after the remote focus unit along a beam path of the light from the source to the sample objective, such that the changing the position of the focal plane along the axis is performed before the directing the focused light to the location within the focal plane.

7 Claims, 9 Drawing Sheets

Related U.S. Application Data on Jan. 22, 2016, provisional application No. 62/286,317, filed on Jan. 23, 2016, provisional application No. 62/288,132, filed on Jan. 28, 2016.

(51) Int. Cl.
*G02B 21/36* (2006.01)
*G02B 26/10* (2006.01)
*G06T 11/60* (2006.01)
*H04N 5/225* (2006.01)
*H04N 5/232* (2006.01)

(52) U.S. Cl.
CPC ..... *G02B 21/0048* (2013.01); *G02B 21/0072* (2013.01); *G02B 21/0076* (2013.01); *G02B 21/33* (2013.01); *G02B 21/367* (2013.01); *G02B 26/101* (2013.01); *G06T 11/60* (2013.01); *H04N 5/2254* (2013.01); *H04N 5/2256* (2013.01); *H04N 5/23203* (2013.01); *G06T 2207/10061* (2013.01); *G06T 2207/30016* (2013.01); *H04N 5/23238* (2013.01)

(56) References Cited

U.S. PATENT DOCUMENTS

| | | | |
|---|---|---|---|
| 6,185,030 B1* | 2/2001 | Overbeck | B01L 3/0241 250/586 |
| 6,275,319 B1* | 8/2001 | Gadhok | H02K 7/09 359/198.1 |
| 8,933,418 B2 | 1/2015 | Hayashi | |
| 2002/0163717 A1* | 11/2002 | Lee | G02B 21/0032 359/388 |
| 2004/0032650 A1* | 2/2004 | Lauer | G02B 21/004 359/385 |
| 2005/0046930 A1 | 3/2005 | Olschewski | |
| 2009/0174935 A1* | 7/2009 | Szulczewski | G02B 21/002 359/368 |
| 2011/0122488 A1 | 5/2011 | Truong et al. | |
| 2014/0211305 A1 | 7/2014 | Schwedt et al. | |
| 2015/0020244 A1* | 1/2015 | Humphris | G01Q 20/02 850/6 |
| 2015/0077844 A1 | 3/2015 | Singer et al. | |

OTHER PUBLICATIONS

International Preliminary Report on Patentability (IPRP) with Written Opinion, dated May 1, 2018, for corresponding international application PCT/US2016/059902.

Tsai et al. "Ultra-large field-of-view two-photon microscopy." Optics Express 23:13833-13847.

Stirman et al. "Wide field-of-view, twin-region two-photon imaging across extended cortical networks." bioRxiv.

* cited by examiner

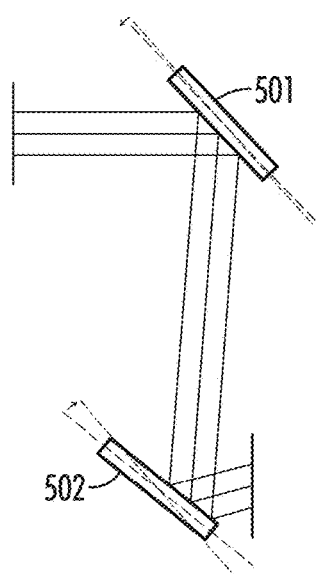
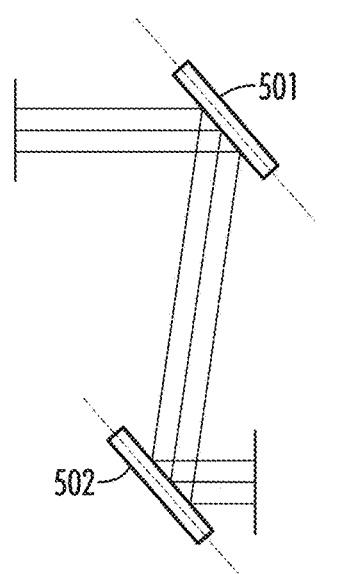
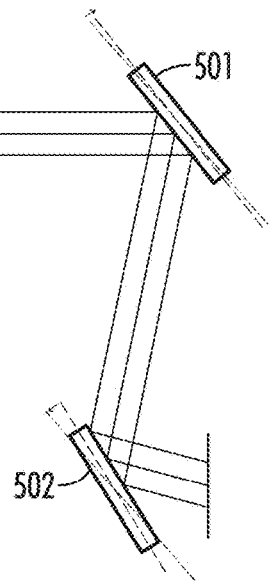
FIG. 5A    FIG. 5B    FIG. 5C
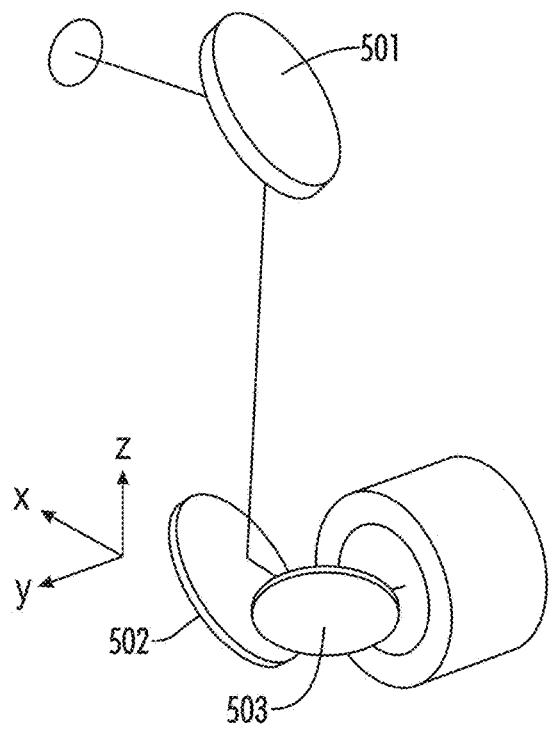
FIG. 5D

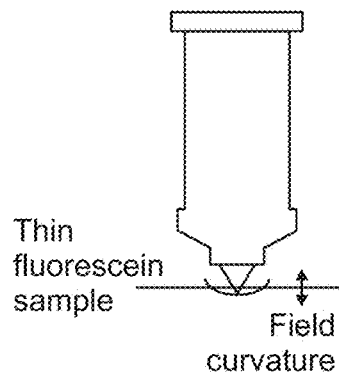
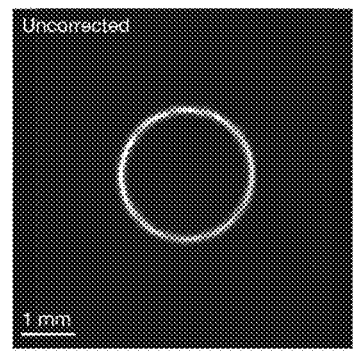
FIG. 6A
FIG. 6B
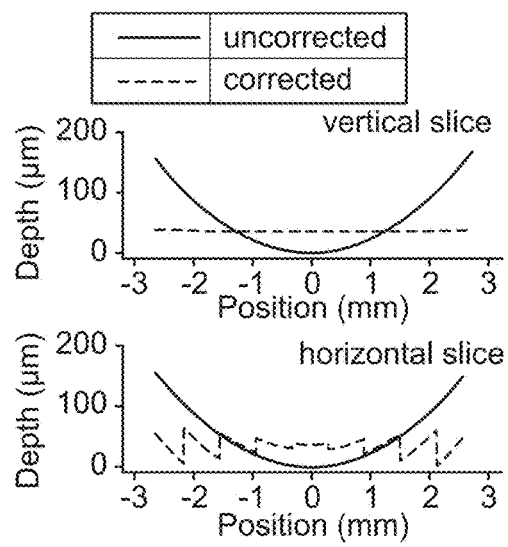
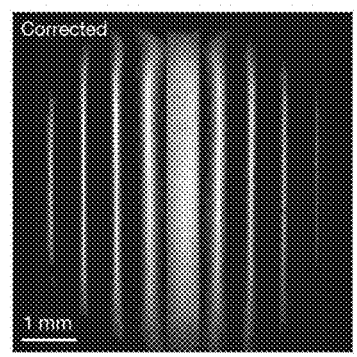
FIG. 6C
FIG. 6D

LARGE FIELD OF VIEW, HIGH RESOLUTION MICROSCOPE

CROSS REFERENCE TO RELATED APPLICATIONS

This application claims the benefit of U.S. Provisional Patent Applications 62/249,342 filed on Nov. 1, 2015; 62/286,108 filed on Jan. 22, 2016; 62/286,317 filed on Jan. 23, 2016; and 62/288,122 filed on Jan. 28, 2016. The disclosures of U.S. Provisional Patent Applications 62/249, 342, 62/286,108, 62/286,317 and 62/288,122 are hereby incorporated by reference.

FIELD OF THE INVENTION

The present invention relates to microscopy, and more specifically to high resolution two-photon microscopy (TPM) with large field of view.

BACKGROUND

Two-photon microscopy (TPM) can provide high resolution and high contrast, even when imaging in scattering tissue. TPM can be used to resolve single cells, such as neurons and subneuronal structures, up to one millimeter deep in tissue. TPM has been used extensively to measure dynamic processes, such as calcium dynamics, in populations of neurons in the intact brain, even during animal behavior. Up to several hundred neurons have been imaged simultaneously, but largely limited to fields of view on the order of half a millimeter within single brain areas.

In point-scanning laser scanning microscopy (LSM), a focused laser is moved over a sample in three dimensions. Laser scanning can be achieved relatively easily in the plane (x-y plane) perpendicular to the optical axis of the scanned beam, but is much more challenging along the optical axis (z), parallel to the direction of the beam is much more challenging. In many microscopes to scan the beam along the optical axis, the objective is physically moved to change the z-location of the focus, but this involves moving a large mass and therefore is relatively slow, limiting the types of images that can be acquired and the types of microscopes that can be practically designed. Alternatively, a stage that supports the sample can be moved along the optical axis while the location of objective remains fixed, but this also involves moving a large mass.

Several applications would benefit from microscopes with much larger fields of view while retaining cellular resolution. Even relatively simple animal behavior involves multiple brain regions, which are often non-contiguous. Probing the interaction of these spatially separated requires imaging both brain areas nearly simultaneously. In primates, cortical areas of interest are often separated by several millimeters across a gyms. Other applications include tracking cellular structures in developing embryos. Imaging multiple brain areas simultaneously is not possible using standard microscopes. High-resolution microscopes have small fields of view, whereas large field-of-view microscopes do not have cellular resolution. The advent of sensitive protein indicators for neural activity (e.g. calcium indicators) and transgenic animals expressing these indicators opens up the possibility of mesoscale imaging. Note that mesoscale microscopy is defined as imaging with cellular resolution and fields of view spanning multiple brain areas or entire organisms (several millimeters).

SUMMARY

A mesoscale microscope according to an embodiment is described herein includes a field of view that is on the order of 5 mm or more, which allows, for example, sampling most cortical regions in the mouse brain that are nearly coplanar. The microscope has better than cellular resolution, which means that the two-photon excitation volume of the microscope is much smaller than the typical size of a soma (e.g., with a diameter of approximately 10 µm). For some embodiments, a numerical aperture (NA) for the excitation of the microscope of 0.6 is selected, which provides for a lateral resolution of approximately 0.5 µm and for an axial resolution of better than 4 µm. The microscope produces diffraction-limited performance and high two-photon excitation efficiency over the range of excitation beam wavelengths (e.g., over a wavelength range of 910-1070 nm (e.g., the wavelength range over which fluorescent protein sensors based on GFP and various red fluorescence proteins are excited using two-photon excitation)), although other excitation wavelengths can also be used. Also, the microscope has high collection efficiency for collecting the fluorescence signal, for example, by using a collection objective NA larger than the excitation NA (0.6).

A key challenge for mesoscale scanning microscopy is speed. Faster scanning provides better time resolution for measurements of neural activity, reduced photodamage, and the potential for tracking larger number of neurons. Rapid scanning methods can make use of resonant mirrors and acousto-optic deflectors (AODs). However, both resonant mirrors and AODs have relatively small scan angles, producing scans in the sample plane that do not span the entire field of view. Some embodiments of the present invention solve this problem by using a scan engine with multiple scanners in series. For example, in some embodiments, a resonant scanner (e.g., with a 24 kHz line rate) can produce fast scanning over approximately 0.5 millimeters, while slower galvanometer scanners (e.g., with a 1 kHz line rate) can provide deflection across the entire field of view of the microscope. This allows moving a fast resonant scan over the sample in a random access manner, for near simultaneous sampling of activity in widely dispersed brain regions.

Another challenge is controlling the scanning of the excitation beam along the optical axis (z-axis) of the microscope. In typical scanning microscopes, the z-axis position of the focal plane of the microscope is controlled by moving the excitation objective, which occurs at a rate that is two orders of magnitude or more slower than x-y scanning within the focal plane. This is unacceptable for mesoscale imaging, because the structures of interest sampled nearly simultaneously in different brain regions can be in focal planes that differ by hundreds of micrometers in the z-direction. However, an embodiment of the present invention addresses this problem by implementing a rapid form of remote focusing.

Several instruments have been designed for large field-of-view in two-photon excitation microscopy. Tsai et al. ("Ultra-large field-of-view two-photon microscopy." Optics Express 23:13833-13847) designed a scanning system based on off-the-shelf components, producing a scan field of 10 mm. Stirman et al. ("Wide field-of-view, twin-region two-photon imaging across extended cortical networks." bioRxiv) used a custom objective, which allowed a field of view of 3.5 mm. However, neither system provides cellular-level resolution. These instruments rely on standard and slow galvo mirrors (e.g., with a 290 Hz line rate), which are too slow for many types of functional imaging. In addition, the microscopes are corrected for only one excitation wavelength (800 nm and 910 nm respectively), limiting their use to a small subset of fluorescent molecules. These microscopes have relatively small numerical apertures for fluorescence collection, which decreases the signal yield (i.e., the fraction of fluorescence photons detected) and decreases the signal-to-noise ratio several fold compared to standard TPM microscopes. Finally, these microscopes do not implement rapid axial scanning.

Disclosed herein are the design, construction, and characterization of a two-photon random access mesoscope (2p-RAM), which provides random access volumes with microscopic resolution. The 2p-RAM can provide diffraction limited resolution over a field of view larger than 5 mm in the x- and y-directions, with remote focusing on the order of 1 mm or more in the z-direction, and random access scanning of tissue volumes.

Specifications for a particular embodiment of the microscope include:
  5 mm FOV—for example, corresponding to the flat section of the mouse brain.
  910-1070 nm excitation light—to be compatible with both GFP-based and RFP-based fluorescent molecules when using two-photon excitation.
  Diffraction limited resolution with an excitation NA=0.6. (Point spread function, approximately 0.6 μm lateral×4 μm axial)—smaller than a neuron.
  Collection NA=1.0; for high efficiency signal detection.
  Fully corrected for triple cover glass (450 μm of glass).
  Optimized for two-photon excitation—this means propagation time delay differences <20 fs (rms) across the microscope aperture for all field points
  Working distance >3 mm
  Strehl ratio >0.8 across the FOV
  Rapid remote focusing with full optical correction for entire lateral field-of-view over >700 μm depth range—possible due to custom, matched design of sample objective (this is the immersion objective that is next to the sample) and remote focus objective To scan the beam within a plane with the microscope, resonant scanning in series with a plurality of slower scanners is used, which serve as relays and which also allow us to move the resonantly scanned beam (e.g., by +/−600 μm in the sample plane) over the entire field of view. For example, roving scanning in which one set of scanners positions the resonant scan FOV scanning can be used. Using scan mirrors as a relay can greatly reduce aberrations and can make effectively large scan angles possible.

Disclosed herein is a new form of remote focusing that allows us to move the focal point of the excitation light over 1 mm in the z-direction in a time period on the order of a few milliseconds, which allows a large three-dimensional FOV to be scanned, which is especially useful when the structures of interest are at different focal planes at locations that are mm's apart. Because many samples of interest (e.g., a brain) include curved structures, performing rapid z-focusing is needed. Traditional microscopes make compromises between large field of view and high resolution. Brains and other organs have sizes on the order of several millimeters of more, but their cellular components have structures with sizes that are on the order of micrometers. To image entire brain structures at cellular resolution, the microscope described herein can be used for in vivo imaging. In one embodiment, the microscope is designed for two-photon microscopy with diffraction-limited resolution (0.5 μm lateral; 4 μm axial) over a field of view of approximately 5 mm. The size of the FOV is chosen because it corresponds to the size of interesting parts of the brain in many species, from mice to primates. The microscope meets design criteria for a microscope with unique capabilities:
  Low propagation time delay differences across the aperture of the microscope, at all field points, to preserve high two-photon excitation efficiency.
  A Strehl ratio of greater than 0.8 across the field of view of the microscope.
  The above criteria being achieved for a large range of excitation wavelengths, from 900 nm for excitation of green fluorescent protein, to 1070 nm for excitation of red fluorescent protein.
  The working distance is greater than 2.5 mm, allowing imaging into >1 mm of brain tissue without steric hindrance.
  High numerical aperture for excitation, ensuring high-resolution imaging (e.g., a numerical aperture of NA=0.6), giving subcellular resolution (0.6 μm lateral, 4 μm axial).
  Numerical aperture for fluorescence detection significantly higher than that of numerical aperture for excitation (e.g., NA=1.0).
  Full correction for 450 micrometers of cover glass between the objective and sample. The use of thick glass is typical for imaging applications; the 2p-RAM is already corrected for this glass.
  The scan system is based on two scan systems in series, to move a rapid raster scan produced by a resonant scanning system over the sample in a random access manner. This allows access to the full field of view using flexible and rapid scanning.
  The system uses a novel form of rapid remote focusing. Rapid focusing is critical since large structures are rarely planar, and the scan depth needs to be adjusted rapidly with the lateral scan.

The microscope provides a unique combination of a large field of view and a high resolution and the ability to rapidly navigate huge tissue volumes, orders of magnitude larger than previous microscopes.

When the sample objective (SO) (also known as the excitation objective (EO)) requires an unusually high optical étendue, such as for a multiphoton microscope with an NA of 0.6 and a 5 mm diameter field-of-view, the remote focusing objective (RFO) can be placed in the beam path before the beam is laterally scanned. This allows the étendue, and thus size, complexity, and cost, of the RFO to be much lower than that of the SO. In other implementations, the RFO can be placed in the beam path after the beam is laterally scanned. In addition, optics downstream in the beam path of the RFO can be made such that the remote focusing is invariant to lateral scanning, and thus diffraction-limited focusing can be achieved over a large volume with this arrangement.

Note that the term étendue can be thought of as the 4-dimensional "volume" of optical rays that the system is designed to support. For a microscope with constant numerical aperture (NA) over its field-of-view (with area A), the étendue is given by $\pi*A*NA^2$. Assuming that the imaging performance is diffraction-limited over the field of view, the supported étendue is proportional to the number of optically resolvable points (resels) in the available image.

Furthermore, remote focusing is an important technique to use in microscopes with a very large field of view. First, it allows the overall optical design to have a relatively large amount of field curvature; this field curvature can be compensated in real-time by the remote focusing movement. For example, as the beam is scanned laterally in a plane that is perpendicular to the propagation direction of the excitation light, the remote focusing objective can be automatically controlled to compensate for the field curvature of the optical elements in the beam path of the excitation light, thus maintaining the focus of the excitation beam in a plane within the sample. Alternatively, uncompensated field curvature generates images where the focused area is in the shape of annual ring. Scanning the collected images along the z-axis generate a series of concentric annual rings that can be registered and combined accordingly.

Optical designs that can tolerate relatively large field curvature of the optics simplify the optical design of a large étendue system, in addition to the simplifications achieved by eliminating the lateral scanning in the RFO, and make large field-of-view microscopes possible.

An embodiment of the present invention provides a microscope system including: a source of light; a sample objective configured for focusing the light at a focal plane within a sample; a remote focus unit configured for changing a position of the focal plane along an axis perpendicular to the focal plane; one or more optical element configured for directing the focused light to a location within the focal plane; and a detector configured for detecting light emitted from the focal plane within the sample; wherein the one or more optical element is located after the remote focus unit along a beam path of the light from the source to the sample objective, such that the changing the position of the focal plane along the axis is performed before the directing the focused light to the location within the focal plane.

An embodiment of the present invention provides a lateral scan unit including a first rotatable mirror, a second rotatable mirror, and a third rotatable mirror configured for scanning a light beam within a focal plane; wherein rotation of the first and second mirrors scans the light beam in the same plane, such that the beam rotates about a pupil downstream of the first and second mirrors; wherein the third mirror is located at the pupil; and wherein rotation of the third mirror scans the light beam in a plane that is orthogonal to the plane in which the beam is scanned by the first and second mirrors.

An embodiment of the present invention provides a microscopic imaging method including: providing a source of light; focusing, by a sample objective, the light at a focal plane within a sample; changing, by a remote focus unit, a position of the focal plane along an axis perpendicular to the focal plane; directing, by a lateral scan unit, the focused light to a location within the focal plane; and detecting, by a detector, light emitted from the focal plane within the sample; wherein the one or more optical element is located after the remote focus unit along a beam path of the excitation light from the source to the sample objective, such that the changing the position of the focal plane along the axis is performed before the scanning the focused excitation within the focal plane.

An embodiment of the present invention provides a method for scanning a light beam within a focal plane, including: rotating a first rotatable mirror and a second rotatable mirror in order to scan the light beam in the same plane, such that the beam rotates about a pupil downstream of the first and second mirrors; locating a third mirror at the pupil, and rotating of the third mirror in order to scan the light beam in a plane that is orthogonal to the plane in which the beam is scanned by the first and second mirrors.

BRIEF DESCRIPTION OF THE DRAWINGS

FIGS. 5A-5D show an arrangement of scan mirrors, including the virtually conjugated galvo pair, according to an embodiment.

FIGS. 6A-6D illustrate the characterization and correction of field curvature according to an embodiment.

DETAILED DESCRIPTION OF THE PREFERRED EMBODIMENTS

Figure 1:
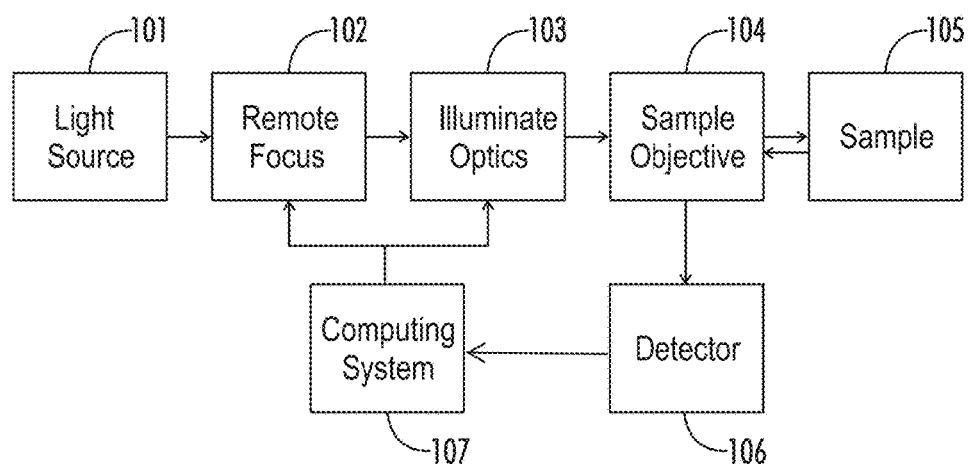
FIG. 1 shows a block diagram of a microscope system according to an embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

FIG. 1 is a high level block diagram of a microscope system according to an embodiment. A microscope system includes a source of light 101; a sample objective 104 for focusing the light at a focal plane within a sample 105; a remote focus unit 102 for changing a position of the focal plane along a z-axis of the sample objective; illuminating optics 103 for directing the focused light within the focal plane; and a detector 106 for detecting light emitted from the focal plane within the sample in response to the focused excitation light. It is noted that a skilled person would be able to use a configuration of one or more optical element, or the equivalents to direct the light to a location within the plane.

Figure 2:
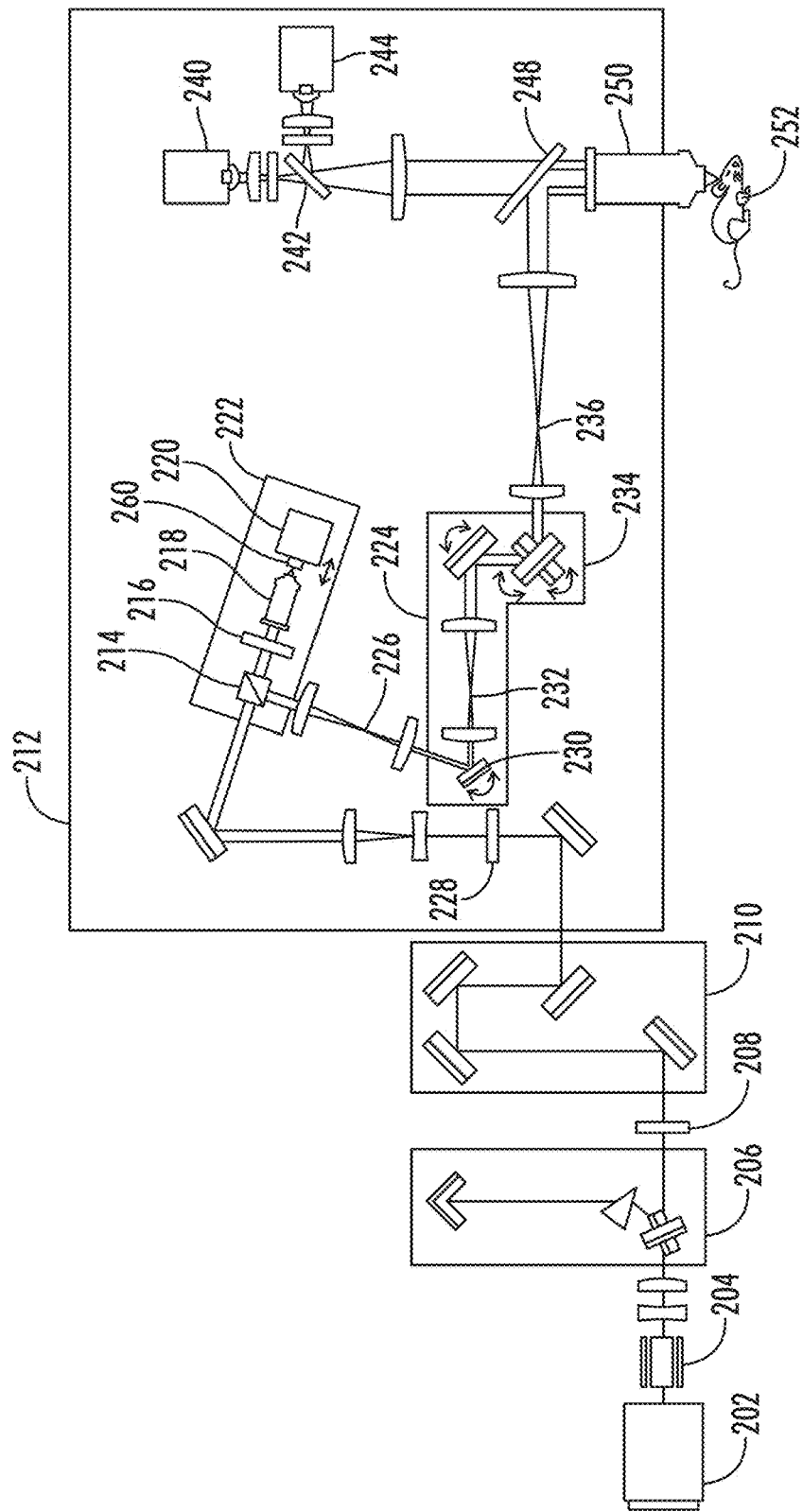
FIG. 2 shows a schematic diagram of a microscope system according to an embodiment.

By scanning the location within the plane, scanning microscopy can be performed. A specific implementation of the microscope system according to an embodiment is shown in FIG. 2. As shown in FIG. 2, an excitation source 202 (e.g., Ti:Saphh) provides excitation light. An electro-optical modulator (EOM) 204 is used to rapidly modulate the beam intensity. A prism-based pre-chirp structure 206 is used to compensate for group-delay dispersion (GDD) introduced by the refractive optics of the microscope. The beam passes through a quarter wave plate (QWP) 208 into a multi-stage periscope 210. The microscope 212 is motorized to allow flexible access to the sample. In one embodiment, the microscope can move in x, y, rotate around an axis that passes through the sample plane and is parallel to the long axis of the microscope, and move up and down along the beam axis for coarse focusing. Since the microscope moves with respect to the laser, the beam is threaded into the microscope through the multi-stage periscope 210. Within the core of the microscope, the beam first enters the remote focus unit (RFU) 222 through a polarizing beam splitting cube (PBS) 214 and a quarter wave plate (QWP) 216. The RFU 222 includes a remote focusing objective (RFO) 218, and a small mirror 260 mounted on a movable stage 220. The beam passes through the RFO 218 and is reflected by the mirror 260 back through the RFO 218. The QWP 216 and PBS 214 together then direct the beam into the lateral scan unit (LSU) 224.

In one embodiment, the movable stage 220 includes a voice coil that moves the mirror 260 back and forth along the axis of the RFO 218. In other embodiments, for example, a piezoelectric device, is used in place of, or in combination with, the voice coil to move the position of the mirror.

The RFU 222 is used to control a position of the focal point of the excitation light in the sample in a direction along the propagation direction of the excitation light in the sample. The entrance aperture of the RFO is conjugate to the entrance aperture of the imaging objective (IO). The mirror 260 is approximately conjugate to the focus in the sample plane. Axial movement of the mirror 260 changes the axial location of the focus in the sample.

After reflection off the mirror mounted on the movable stage, the excitation beam can be reflected by the beam splitter and directed to a resonant scanning mirror 230 and then by one or more galvanometer mirrors. The scanning mirrors can scan a focal point of the excitation light within the sample in directions perpendicular to the propagation direction of the excitation light in the sample (e.g., in the x- and y-directions).

After the resonant mirror and the galvanometer mirrors, the excitation beam is reflected off a dichroic beam splitter 248 and focused by a sample objective (SO) 250 to a focal point within the sample 252. The excitation beam may fill less than the entire surface of the back pupil of the sample objective, and the numerical aperture of the excitation optics can be about 0.6.

Fluorescence emission light emitted from the sample is collected by the sample objective and then provided to one or more detectors (PMT) 240, 244 via the beam splitter 242. The entire back pupil of the sample objective is used to collect fluorescence emission radiation, so that the numerical aperture of the detection optics can be about 1.0.

The optical characteristics of the RFO can be selected to compensate for spherical aberrations and chromatic aberrations introduced to the excitation beam that is provided to the sample caused by providing a converging/diverging, non-plane wave to the back pupil of the sample objective, due to using the RFO to move the focal plane of the excitation light.

In FIG. 2 example optical elements 226, 232 and 236 are also shown for relay imaging pupil planes.

Figure 3:
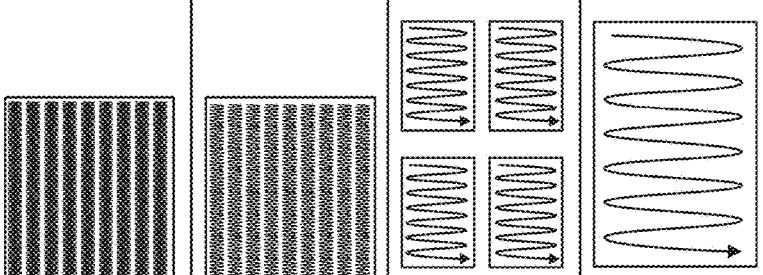
FIG. 3 shows examples of scan patterns and scan parameters for moving a resonantly scanned beam over the entire FOV of the microscope according to an embodiment.

FIG. 3 shows examples of scan patterns and scan parameters for moving the resonantly scanned beam over the entire FOV of the microscope. The scan pattern can use various different numbers of stripes, where moving from one stripe to another involves moving the beam with a relatively slow scanners, while scanning the beam over a line within a stripe involves moving the beam with a relatively fast resonant scanner. For example, a fast resonant scan (with, e.g., a time per scan line of 42 µs; corresponding to 24 kHz line rate) can be made over patches up to about 600 µm wide. The time per patch can be 42 µs×the number of lines, and the entire field of view can be covered in nine stripes. A slow (e.g., 1.5 Hz), high-resolution scan can have up to 5,000 lines per stripe. A faster (4.3 Hz), low-resolution scan can have up to 500 lines per stripe. Other scans can involve sampling multiple smaller patches at high resolution and frame rates.

Figure 4:
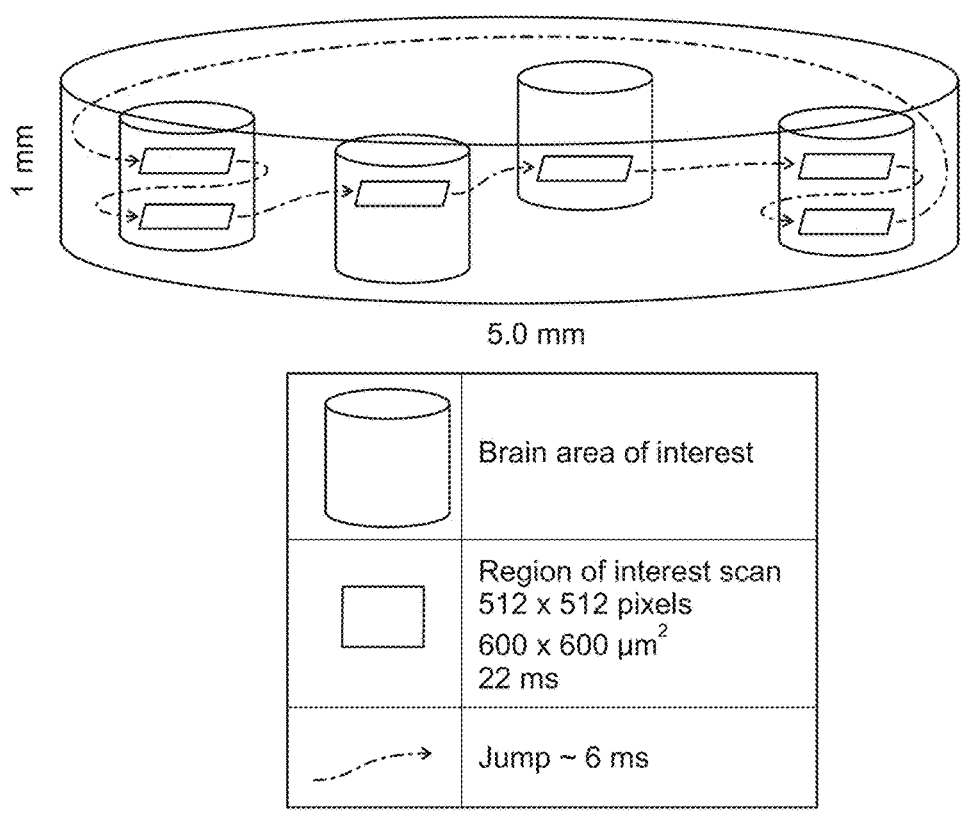
FIG. 4 illustrates random access scanning of a sample according to an embodiment.

FIG. 4 is a schematic diagram showing an example of random access scanning. For example, the entire imaging volume can include a cylinder with a 5 mm diameter and 1 mm depth. The fast scanning can be made in a plurality of different planes perpendicular to the propagation direction of the excitation beam, and the different planes can be accessed by jumping between planes by using the RFO to change the z-direction location of the focal point within the sample volume.

Most laser-scanning microscopes employ two scanning mirrors to steer a laser beam to access different parts of the field of view. If the scan mirrors are not made conjugate to one another (where conjugation can be achieved, for example, by imaging one scanning mirror onto the other scanning mirror with relay imaging optics), then the beam/wavefront will shift laterally relative to downstream optical pupils when the mirrors are scanned, causing significant optical aberrations.

In many laser-scanning microscopes, this pupil shift will cause light vignetting (partial blockage) to occur at high field points, and in all but the optically simplest of laser-scanning microscopes (where all optical pupils see a planar beam wavefront), this pupil shift can cause significant optical aberrations. In most microscopes, the only method used to conjugate scan mirrors is to employ relay imaging optics (typically of a 4f design). In microscopes that employ stock objective lenses, this is generally not an issue, in that relatively simple optical designs, using optics also available from stock, can perform this relay imaging adequately and maintain diffraction-limited performance. However, for microscopes designed to use an unusually large étendue relative to conventional microscopes, such as the two-photon laser-scanning microscope with a 5 mm field-of-view (FOV) and 0.6 NA described herein, the 4f imaging relay lenses would have to be custom designed, such that they would be relatively large and expensive to produce and potentially the most complex and expensive part of the microscope.

However, the increased size and expense of this optical relay can be avoided, by scanning the excitation beam in x- and y-dimensions within the sample using three scan mirrors rather than two, such that the pupils of the x- and y-scanning are coincident, without the usage of any additional optics. In one embodiment, two mirrors are scanned simultaneously, and in the same plane, such that the beam rotates about a pupil downstream of both mirrors. This pupil is placed upon the third mirror, which is scanned in the orthogonal direction. If the function that connects the scan positions of the first two mirrors is a strict proportionality, then the downstream pupil can remain substantially stationary over a large scan range. Other higher-order functions may be used to make the pupil arbitrarily stationary over a large scan range.

FIGS. 5A-5C are schematic diagrams of two scanning mirrors 501, 502 operating together to produce a virtual pupil at which the direction of the beam can be varied. The beam enters from the upper-left, and the virtual pupil is in the lower-right. FIGS. 5A-5C illustrate different ray paths corresponding to different field/scan positions. The two mirrors are scanned simultaneously, being rotated about parallel axes, such that both scan the beam in the same plane, so that the direction of the beam rotates about the virtual pupil. For example, as shown in FIGS. 5A-5C, the different rays at the virtual pupil in the lower-right show incident beams having different directions, but propagating in the same plane (e.g., the x-z plane,), due to different angular orientations of the two upstream mirrors. A scan mirror that scans the beam in the orthogonal plane (e.g., the y-z plane) can be placed at the pupil in the lower-right.

FIG. 5D is a schematic diagram showing all three scan mirrors, including the two upstream scanning mirrors 501, 502 that operate together to rotate the direction of the beam along with downstream scanning mirror 503 that scans the beam in the direction orthogonal to the direction in which the beam is rotated/scanned at the virtual pupil. The first two mirrors 501, 502 are operated in cooperation with each other, so that a virtual pupil is maintained at the location of the third mirror 503. The first two mirrors are operated in cooperation with each other to rotate the direction of the beam in a first plane at the virtual pupil, with insignificant translation of the beam across the virtual pupil, while the third mirror is operated to rotate the direction of the beam in a second plane, perpendicular to the first plane. When the first two mirrors are operated in this manner, the combination of the first two mirrors is virtually conjugated to the third mirror.

In point-scanning laser scanning microscopy (LSM) a focused laser is moved over a sample in three dimensions. Laser scanning can be achieved easily in the direction lateral to the optical axis, but is much more challenging along the optical axis (z). In the vast majority of microscopes the objective is moved to move the z-location of the focus. These movements involve a large mass and are therefore relatively slow, limiting the types of images that can be acquired and the types of microscopes that can be practically designed. An embodiment of the present invention uses non-laterally-scanned remote focusing microscopy to rapidly move a focus along the beam axis. An objective lens and a mirror placed in the focal space of this objective lens are used to first scan a laser beam in axial space before it is scanned laterally. The beam is then focused by a different objective lens to excite a sample for LSM. In traditional remote focusing, the beam is scanned laterally first, and is then sent into the two-objective remote focusing system.

In one embodiment, as shown FIG. 1, the system includes a computing system 107 having at least one processor, which is used to automatically control the galvo mirrors to scan the focal point within the sample in the directions perpendicular to the propagation direction of the excitation light in the sample. In another embodiment, the computing system 107 is also used to automatically control the remote focusing system 102, such that the position of the focal point of the excitation light in the sample remains in a plane perpendicular to the propagation direction as the focal point is scanned in directions perpendicular to the propagation.

For example, the field curvature of the excitation optics can be parameterized by providing a focused excitation beam through the sample objective into a thin calibration sample having a known fluorescence emission response to an excitation beam. Then, as the beam is scanned in directions perpendicular to the propagation direction, the fluorescence emission response from the calibration sample can be monitored to determine the field curvature of the excitation optic or to determine how much the focal point shifts in the z-direction from a flat plane as the beam in scanned in directions parallel to the flat plane.

Once the excitation optics have been parameterized, the parameterization can be used while the beam in scanned in directions perpendicular to the propagation direction of the beam to maintain the focal point of the beam in a plane. For example, as the focal point of the beam is scanned laterally in the x- and y-directions, the remote focusing system can dynamically control the position of the focus along the z-direction to maintain the position of the focal point within a plane, despite the field curvature that may be introduced by the excitation optics. Thus, the remote focusing system can be used not only to move the focal point of the excitation light to different planes in the z-direction (e.g., to create a 3D image of the sample), but also to correct for field curvature of the sample objective as the focal point is scanned within a plane. In some implementations, the RFO can be controlled in real time as the beam is scanned by the galvo mirrors in response to the position of the beam caused by the galvo mirrors, while the RFO is not controlled in response to the orientation of the resonant scanning mirror. In some implementations, the RFO can be controlled in real time as the beam is scanned by the galvo mirrors in response to both the position of the focal point of the beam caused by the galvo mirrors and the position of the focal point caused by the orientation of the resonant scanning mirror.

FIGS. 6A-6D illustrate the characterization and correction of field curvature. FIG. 6A shows the field curvature being measured using a thin fluorescein sample (e.g., a 11.2 μm thick fluorescein sample sandwiched between a microscope slide and 450 μm thick coverglass). At a particular remote focus position, the image of the sample was a fluorescent ring due to the field curvature of the optic causing only an annual ring of the excitation beam to excite fluorescence emission light from the fluorescein sample. The diameter of the ring could be measured as a function of remote focus position. FIG. 6B is a schematic diagram of an image of the sample without any correction for field curvature, with the sample appearing as a thin ring. FIG. 6C is a schematic diagram of the measured field curvature (solid line: before field curvature correction; dash line: after field curvature correction). FIG. 6D is a schematic diagram of an image of the sample obtain when the remote focus mirror was programmed to compensate for the field curvature. The compensation is done on a line-by-line basis using the average position of the resonant mirror during the line as the point to correct. In the example shown in FIG. 6D, the field curvature compensation corrects the field curvature along each stripe, but does not correct the field curvature within a resonant scan, because the resonant mirror moves faster than the dynamic response of the RFO is capable of tracking.

In some embodiments, the sample objective, when used for two-photon laser scanning microscopy (TPM), can have a first NA for the two-photon excitation radiation that is provided to the sample, and a second NA, higher than the first NA, for the fluorescence radiation collection. For example, the objective lens can have an excitation NA of about 0.6 (over a 5 mm in diameter FOV) and a collection NA of about 1.0. The physical apertures of the lenses in the objective allow the NA 1.0 collection, while the objective only supports diffraction-limited imaging if the excitation beam entering it has a width corresponding to the lower excitation NA.

Objective lenses in TPM systems serve a dual role—both to focus the excitation beam to the smallest point possible (to achieve efficient two-photon excitation and high resolution), and to collect the resulting fluorescence from two-photon excitation for transfer to the light detector. The focusing role requires the objective to have, ideally, diffraction-limited optical performance, which, for useful NA and field-of-view (FOV) specifications, requires complex optical designs and difficult manufacturing tolerances. These difficulties grow super-linearly as the NA of the objective increases, so choosing the excitation NA requires balancing the required two-photon excitation efficiency and resolution, which increase with NA, with lens cost and manufacturability.

High NA is also important for efficient fluorescence collection, because the amount of light collected increases roughly as $(NA)^2$. However, in contrast to excitation, the performance of the objective lens for collection can be orders of magnitude worse (in terms of wavefront error) than is needed for diffraction-limited excitation performance, because the collected light is not imaged, but is simply collected onto a single, large, photosensitive surface (typically a PMT photocathode). Therefore, the ideal objective lens design for TPM imaging will support a collection NA that is higher than its excitation NA. This can be accomplished by selecting the individual lenses of the objective to be thick enough, such that their maximum clear apertures (limited by edge thickness) can support the larger collection NA, while also enabling diffraction limited performance for excitation radiation that is provided through the individual lenses of the objective when less than the full rear pupil of the objective lens is illuminated by the excitation light.

Figure 7:
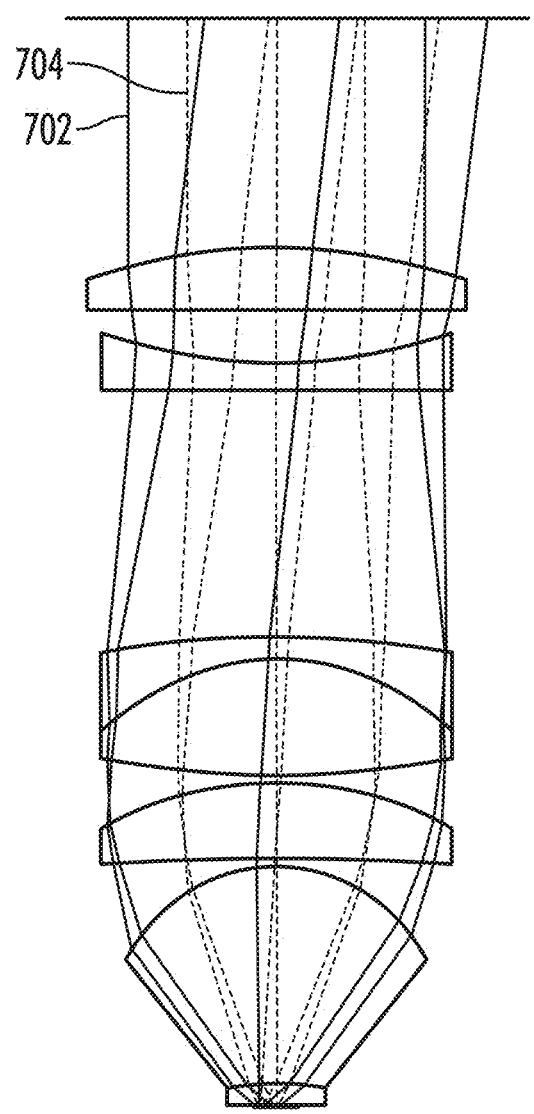
FIG. 7 is a schematic drawing of an example objective lens according to an embodiment.

FIG. 7 is a schematic drawing of an example objective lens that provides diffraction-limited excitation with an NA that is lower than the NA of the lens when it is used for collecting fluorescence emission light from the sample. Dash lines 704 show diffraction limited excitation paths at NA 0.6. Solid lines 702 show collection paths at NA 1.0. Note that excitation and collection paths have different pupil locations. For example, two excitation pathways (shown with dash lines) show the focus of the excitation beam being provided to different locations within sample to illustrate that the excitation beam can be scanned over a relatively wide FOV within the sample. The excitation pathways (dash lines) 704 also show how the excitation does not fill the entire rear pupil of the objective, but rather illuminates only a sub-portion of the rear pupil so that diffraction-limited performance is attained, with a lower NA than would exist if the entire pupil were illuminated. The fluorescence pathways (solid lines) 702 show how emission light can be collected with the objective with a larger NA than the effective NA of the objective for the provision of excitation light to the sample.

In a two-photon laser scanning microscope, the étendue of fluorescence light collection by the objective lens should be matched or exceeded by the étendue of the light detector (e.g., a photomultiplier tube (PMT)), so that signal photons are not wasted and are collected by the detector. In most microscopes, and with most PMTs used for microscopy, this is not an issue, as these PMTs have active photocathode areas much larger than the objective field-of-view (FOV), and support sizable collection angles. However, for the large field of view, high-resolution microscope (2p-RAM) described herein for in vivo imaging, the objective lens collects fluorescence light with an NA of 1.0 over a FOV of approximately 6 mm in diameter, and the étendue of this collected emission light exceeds the étendue of the current state-of-the-art PMTs that are used (e.g., GaAsP photocathode PMTs), which only have an active collection area of 5 mm in diameter and a usable NA of approximately 0.9, making it impossible for all of this fluorescence light to be detected. Adding a condenser lens to the PMT with an immersion fluid between the lens and glass PMT envelope allows the collection NA of the PMT to exceed 1.0—in one embodiment, the fluorescence light at the PMT reaches an NA of 1.4 when oil immersion is used between the condenser lens and the PMT, and all (not counting reflection losses) of the fluorescence that is collected by the objective lens can be projected onto the PMT for detection.

In some implementations, a custom condenser lens can be used to focus the fluorescence emission light onto the photomultiplier tube in combination with an intermediate optical immersion liquid, such as immersion oil, that fills the space between the lens and the PMT in which the fluorescence emission light travels. A custom designed metal part is used to rigidly attach the lens to the PMT for mechanical stability.

Figure 8:
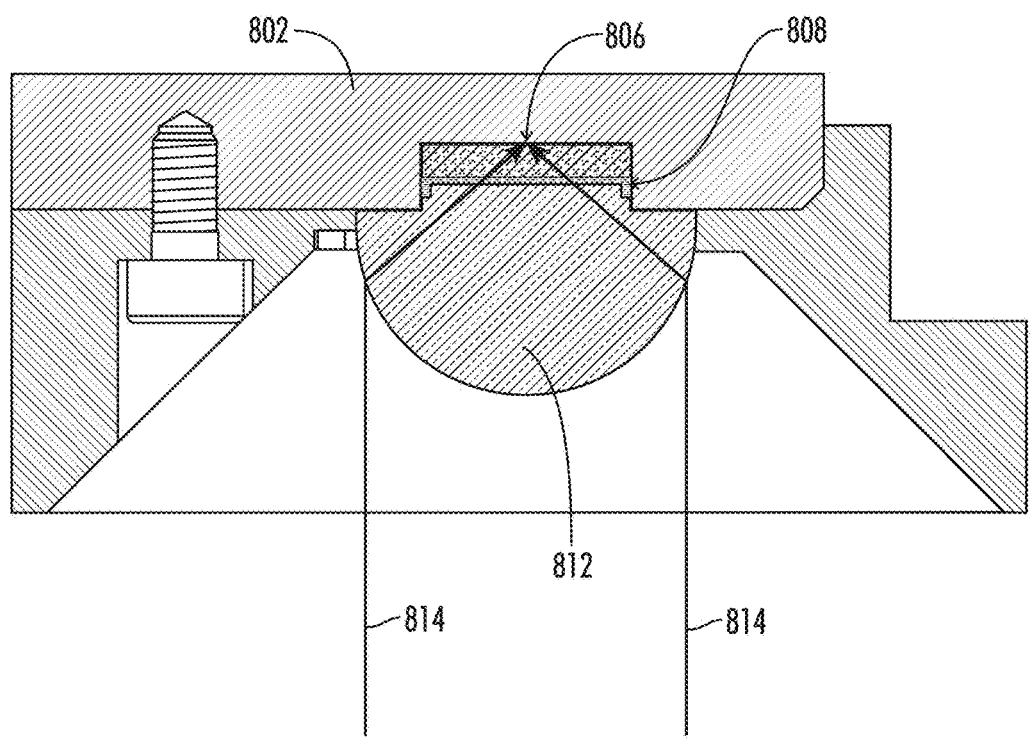
FIG. 8 is a schematic diagram of a PMT with a condenser lens in front of the lens and an immersion fluid between the lens and the PMT according to an embodiment.

FIG. 8 is a schematic diagram of a PMT 802 with a condenser lens 812 in front of the lens and an immersion fluid 808 between the lens and the PMT. Fluorescence emission light 814 is focused by the condenser lens to the photocathode 806 of the PMT detector. When a high index of refraction fluid is placed in contact with the flat side of the condenser lens between the photocathode and the lens, then even the light gathered from the edges of the lens can exit the lens and travel to the PMT, rather than be stopped by total internal reflection at the flat surface of the lens.

Figure 9:
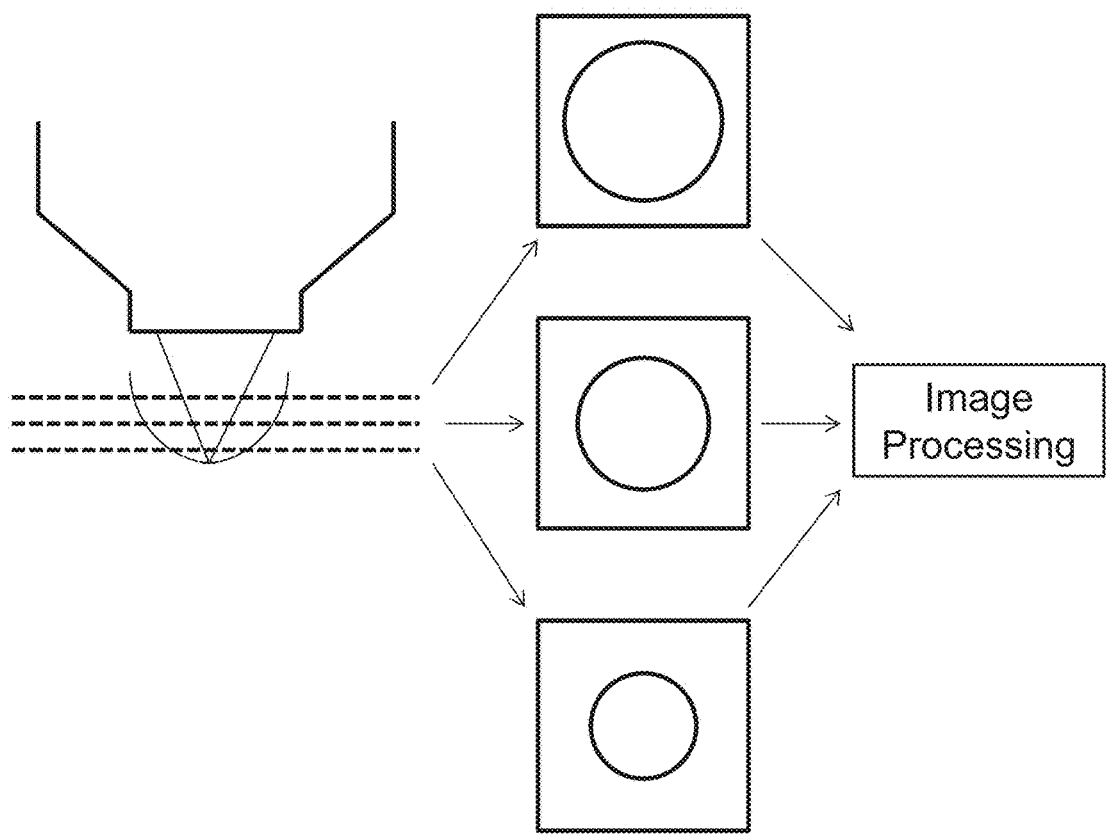
FIG. 9 illustrates large field of view imaging according to an embodiment.

FIG. 9 illustrates large field of view imaging according to an embodiment. Instead of correcting the field curvature of the sample objective as shown in FIGS. 6A-6D, FIG. 9 shows that uncompensated field curvature generates images where the focused area is in the shape of annual ring. Scanning the collected images along the z-axis generate a series of concentric annual rings that can be registered and combined accordingly.

Embodiments of the present invention disclosed herein have unique advantages over existing systems and techniques. As discussed above, the technique of remote focusing microscopy uses paired objective lenses and an axially moving mirror in the focal space of one objective (remote focus objective, RFO) to allow the focus plane of the other objective (sample objective, SO) to be changed rapidly with minimal optical aberration. Existing implementations of this technique place the RFO in the beam path after the beam has been laterally scanned, such that the RFO and SO have equivalent optical étendue. This arrangement is optimal when commercially available objective lenses, which already support the same optical étendue, are used as the RFO and SO. However, when the SO is needed to have an unusually high optical étendue, an arrangement according to an embodiment, in which the RFO is placed in the beam path before the beam is laterally scanned, is preferable. This allows the étendue, and thus size, complexity, and cost, of the RFO to be much lower than that of the SO. In one embodiment, optics subsequent to the RFO are made such that the remote focusing is invariant to lateral scanning, and thus diffraction-limited focusing is achieved over a large volume with this arrangement. Furthermore, remote focusing is a particularly important technique to use in microscopes with a very large field of view because it allows the overall optical design to have a relatively large amount of field curvature; this field curvature can be compensated in real-time by the remote focusing movement. Optical designs with field curvature dramatically simplify the optical design of a large étendue system, in addition to the simplifications achieved by eliminating the lateral scanning in the RFO.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

Although particular parameters used with particular embodiments of the microscope are mentioned herein, it is understood that the invention is not limited to any particular parameters that have been used with particular embodiments. All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A lateral scan unit comprising a first rotatable mirror, a second rotatable mirror, and a third rotatable mirror configured for scanning a light beam within a focal plane;
   wherein rotation of the first and second mirrors scans the light beam in the same plane, and the first and second mirrors rotate simultaneously about parallel axes with an angle of rotation of the first mirror being proportional to an angle of rotation of the second mirror, such that the beam rotates about a pupil downstream of the first and second mirrors;
   wherein the third mirror is located at the pupil about which the beam rotates by the first and second mirrors; and
   wherein rotation of the third mirror scans the light beam in a plane that is orthogonal to the plane in which the beam is scanned by the first and second mirrors.

2. The lateral scan unit of claim 1, further comprising a forth rotatable mirror arranged in series with the first, second and third mirrors.

3. The lateral scan unit of claim 2, wherein scan rate of the fourth mirror is higher than scan rates of the first, second and third mirrors, and scan range of the fourth mirror is less than scan ranges of the first, second and third mirrors.

4. The lateral scan unit of claim 3, wherein the first, second and third mirrors are galvo scan mirrors, and the fourth mirror is a resonant scan mirror.

5. A method for scanning a light beam within a focal plane, comprising:
   rotating a first rotatable mirror and a second rotatable mirror simultaneously about parallel axes in order to scan the light beam in the same plane, wherein an angle of rotation of the first mirror being proportional to an angle of rotation of the second mirror, such that the beam rotates about a pupil downstream of the first and second mirrors; locating a third mirror at the pupil about which the beam rotates by the first and second mirrors, and
   rotating of the third mirror in order to scan the light beam in a plane that is orthogonal to the plane in which the beam is scanned by the first and second mirrors.

6. The method of claim 5, further comprising scanning by a forth rotatable mirror arranged in series with the first, second and third mirrors.

7. The method of claim 6, further comprising rotating the fourth mirror at a rate higher than rotation rates of the first, second and third mirrors, and rotating the fourth mirror at a range less than rotation ranges of the first, second and third mirrors.

* * * * *